June 14, 1960 V. L. FRANTZ 2,940,465
CONTROL VALVE
Filed July 27, 1956

Inventor:
Virgil L. Frantz
By Wilmer Mecklin
his Attorney

United States Patent Office 2,940,465
Patented June 14, 1960

2,940,465
CONTROL VALVE

Virgil Lanier Frantz, Salem, Va., assignor to Graham-White Sales Corp., Salem, Va., a corporation of Virginia Filed July 27, 1956, Ser. No. 600,537

3 Claims. (Cl. 137—271)

This invention relates to control valves for controlling the operation of mechanisms actuated by fluid pressure.

In operating the fluid pressure actuated mechanisms with which practically all motor vehicles, from a diesel locomotive to the family car, are equipped, it is customary to employ one or more control valves conveniently mounted on an instrument panel. Generally each valve is engineered for the particular mechanism which it is designed to control and while the working parts of such valves are made removable for repair or replacement, the parts usually are removable separately and only by loosening a nut or other securing means at the rear of the panel. As a result, it not only is inconvenient and often a difficult operation to apply or remove the working parts, but it has been practically impossible to adapt a housing to take any of several different types of valves, a prerequisite to standardization, especially in the case of multiple unit valves.

An object of the present invention is to provide an improved multiple unit fluid valve wherein by use of cartridges each containing a complete valve operating mechanism and insertible as a unit, the same housing may be adapted for installations requiring valves of different operating characteristics.

Another object of the invention is to provide a piston-type fluid valve wherein by utilizing cartridges of uniform external configuration, each containing a piston and associated working parts and insertible and securable as a unit in a bore in the valve body, and varying the units internally to obtain different operating characteristics, a unit may be replaced at will by another of like or different characteristics to suit various installations without changing the valve body.

An additional object of the invention is to provide a piston-type fluid valve having a housing bored to receive a cartridge containing the valve mechanism, the cartridge as a unit being insertible into and removable from the housing through one end of the bore and being securable in place from that end, whereby the mechanism may be removed for repair or replacement without disturbing the housing or its fluid connections.

A further object of the invention is to provide a piston-type fluid valve employing a cartridge contained operating mechanism wherein the housing and cartridge are cylindrically bored and O-rings are employed as fluid seals, those interposed between the cartridges and piston being common to both components and spaced axially by skeletal thimbles, thus adapting the valve to relatively inexpensive production without adversely affecting its operating efficiency.

Other objects and advantages of the invention will appear hereinafter in the detailed description, be particularly pointed out in the appended claims and be illustrated in the accompanying drawings, in which:

Figure 1:
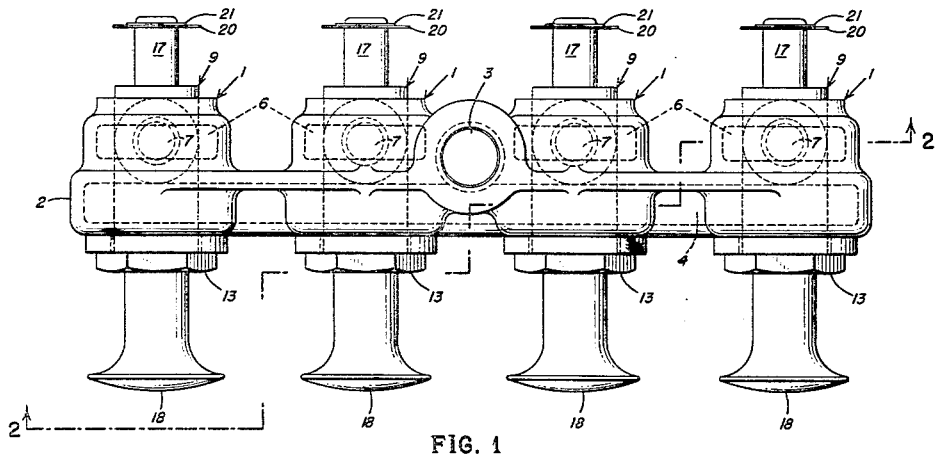
Figure 1 is a plan view of a multiple unit valve embodying the present invention.
Figure 2:
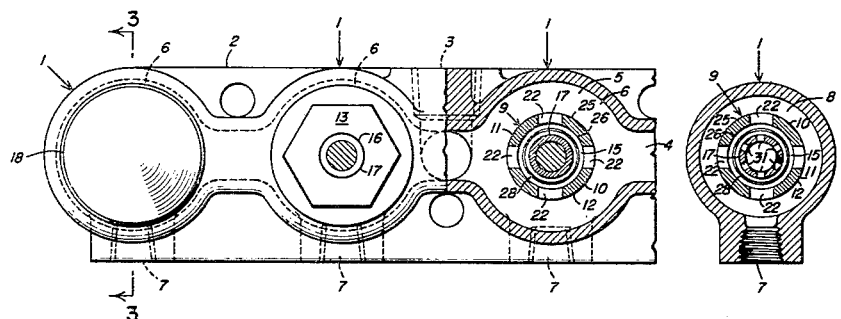
Figure 2 is a vertical sectional view taken along the lines 2—2 of Figure 1.
Figure 3:
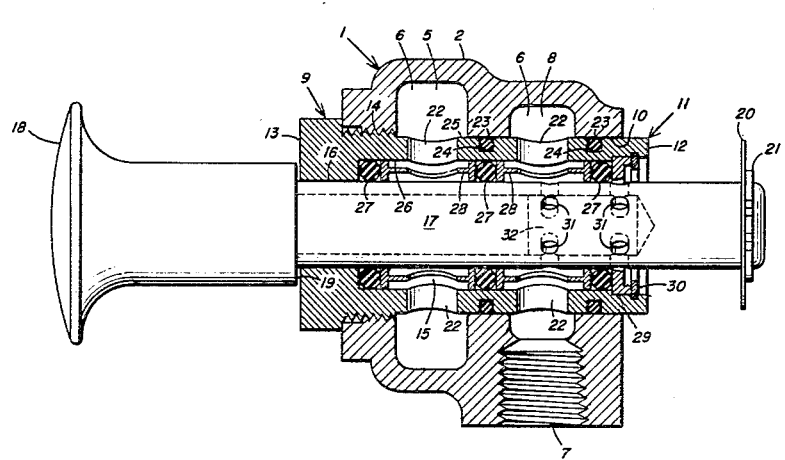
Figure 3 is a vertical sectional view of one of the individual valves taken along the lines 3—3 of Figure 2.

Referring now in detail to the drawings, in which like reference characters designate like parts, the improved control or operating valve of the present invention, while applicable to both single and multiple unit installations, has been illustrated as a multiple unit valve in which a plurality of individual control valves 1 are mounted in a manifold or multiple valve body or housing 2. In some installations, two or more valves may be required to be mounted in series. However, it is more common, particularly with control valves for motor vehicles, to mount the valves in parallel and the illustrated multiple valve is of this type. The manifold 2 thus has single intake 3 connectable to a source of fluid pressure (not shown) and communicating with and connected by a passage 4 to the inlet or intake sides 5 of the valve chambers 6 of the several individual valves 1 and also has a plurality of outlets 7 each connected to the outlet or output side 8 of the valve chamber of one of the individual valves and connectable to one of the fluid actuated mechanisms (not shown) whose operation is to be controlled.

Designed for interchangeability of the valve cartridges 9, the several valve chambers are of uniform configuration, each preferably having its inlet and outlet sides 5 and 8, respectively, communicating at axially spaced stations with a preferably cylindrical axial bore 10, the sides preferably being formed as axially spaced, annular recesses or cavities encircling and connectable through the bore. All of the bores 10 open onto and extend from one face, here the front, through the valve body 2 to its opposite face or back. The valve cartridge 9 for each of the valves is comprised of a cartridge or casing 11 having a tube 12 of substantially uniform cross-section which corresponds in exterior configuration to and is slidable into the bore 10 of the associated valve chamber 6 and an integral head 13 at its outer or front end of greater cross-section than the tube to limit its ingress into the bore. In its preferred form, the cartridge 11 has exterior threads 14 immediately inward of its head 13 for threaded engagement with the valve body to secure the cartridge in place and its head 13 is of hexagonal or like multi-sided configuration for turning by a suitable wrench.

As will be noted, the cartridge 11 projects beyond the rear of the valve body 2 and has a hollow interior 15 extending from its rear end substantially the length of its tube 12. At its front end, the interior 15 opens onto an axial or central opening 16 of restricted cross-section which extends through to the front end of the cartridge and in which slides or rides a piston, plunger or stem 17. The latter carries at its front end an operating knob or handle 18 by which it is actuated and desirably is of sufficient length to extend through the interior 15 and project beyond the rear end of the cartridge 11. Axial movement or reciprocation of the piston 17, once it is in place, relative to the cartridge 11 is limited by a shoulder 19 on the knob 18 at its front end and by a disc or washer 20 at its rear end which is held in place by suitable means such as the snap ring 21. The washer 20 is of such diameter relative to the cartridge as to abut the rear end of the latter at the limit of forward movement of the piston, while passing freely through the valve chamber 6 during insertion or removal of the valve cartridge 9.

For communication between the hollow, preferably cylindrical, interior 15 of the cartridge 11 and the annular recesses 5 and 8 in the valve chamber 6, the tube 12 of the cartridge 11 has one or more radial ports 22 registering, when the cartridge is seated, with each of the annular recesses, the joint between the cartridge and the valve body being sealed intermediate these ports by suitable means, such as the illustrated O-rings 23 seated in annular grooves 24 in the outer wall 25 of the casing. A like seal between the piston 17 and inner wall 26 of the casing may also be provided by a plurality of O-rings 27, one at either side of the port or ports 22 communicating with each of the axially spaced recesses 5 and 8, these O-rings being common to and engaging both piston and casing and axially spaced by thimbles, cages or sleeves 28. Since the thimbles 28 underlie the ports 22 and would otherwise block flow of fluid between them and the interior of the casing, both of the thimbles are axially perforated and at least one may be skeletal in structure. So as to prevent them from shifting during reciprocation of the piston 17, the thimbles 28 and companion O-rings 27 may be locked within the casing by suitable means such as a collar or washer 29 fitting in the rear end of the casing and in turn secured by a snap ring 30. The cartridge 11 thus is a unitary or self-sustaining structure or assembly, the components or parts of which are held in assembled relation without dependence upon the piston 17.

With the above basic construction, valve chambers of uniform configuration, cartridges of uniform exterior configuration, a reciprocable piston contained in each cartridge and communication between the interior of the cartridge and the inlet and outlet sides of the valve chamber, it is made possible by varying the interior structure of the cartridge to provide interchangeable valve cartridge or operating mechanism units of different operating characteristics. The type illustrated in the accompanying drawings is an on and off valve in which the piston has radial openings 31 arranged in sets axially spaced in correspondence to the spacing of the axial ports in the casing and connected interiorly by a central passage or bore 32. As will be seen, the sets of openings are so arranged, longitudinally of the piston, that when the latter is at its inner limit of relative movement, flow of fluid between the inlet and outlet sides of the valve chamber is blocked, while when the piston is pulled out to its opposite limit, fluid flows between these sides through the interior passage in the piston.

Variations in the unit, as by changing the structure of the piston, the thimbles and the porting of the casing, will readily produce a cartridge of different operating characteristics. Thus, while in the illustrated cartridge the piston will be held in open or closed position by the friction of the O-rings, since the longitudinal forces exerted by fluid on it are in balance, it is desirable in some cases that the valve close immediately on release, for example, a control valve for a fluid-actuated starting motor of a diesel engine. This may be provided either by interposing a spring between the disc 20 and the rear end of the tube 12 or by so forming the piston and the interior of the tube that the fluid itself exerts a force urging the valve to closed position. Alternatively, the interior structure of the valve cartridge may be such as to regulate the flow therethrough for controlling the operation of variable speed mechanisms such as wind shield wipers. Other variations are possible, even for the simple two-port housing of the illustrated embodiment, and an even wider range of variations can be obtained by increasing the number of such ports.

In any event, it is made possible by the valve construction of the present invention to secure or detach a valve cartridge entirely from the front of a housing or instrument panel on which such valves are usually supported, without disturbing the fluid connections of the valve body or the mounting of either the body or the panel. This, coupled with the insertion or removal of the operating mechanism as a unit either for repair or for replacement by a like or different mechanism, not only facilitates these operations but makes it possible to use the same valve body for installations requiring valves of different operating characteristics and readily to standardize on multiple units for installations requiring a plurality of control valves. Not only are assembly and removal of the valve cartridge from the valve body simplified, but it is a simple matter once the cartridge is removed to disassemble its several components, starting with removal of the washer 20 holding the piston in the cartridge.

From the above detailed description it will be apparent that there has been provided an improved control valve in which, by containing the operating mechanism in a cartridge insertible as a unit from one end of a valve chamber, both production and repair are facilitated and the same body may readily be adapted for installations requiring valves of different operating characteristics. It should be understood that the described and disclosed embodiment is merely exemplary of the invention and that all modifications are intended to be included which do not depart from either the spirit of the invention or the scope of the appended claims.

Having described my invention, I claim:

1. A multiple unit control valve comprising body means, a plurality of spaced valve chambers in and each opening onto a face of said body means, a plurality of outlet ports in said body means and each connectable to an inlet port therein through one of said chambers, and a plurality of valve units of selectively different operating characteristics interchangeably seatable in said chambers, said valve units being insertible and removable as units and each including a unitary cartridge, a piston shiftable in said cartridge for controlling flow of fluid through a chamber.

2. A multiple unit control valve comprising body means, a plurality of spaced valve chambers in and each opening onto a face of said body means, a plurality of outlet ports in said body means and each connectable to an inlet port therein through one of said chambers, and a plurality of valve units of selectively different operating characteristics interchangeably seatable in said chambers, said valve units being insertible and removable as units and each including a unitary cartridge, a ported hollow piston shiftable in said cartridge for controlling flow of fluid through a chamber.

3. A multiple unit control valve comprising body means, a plurality of spaced uniform valve chambers in and each opening at an end onto a face of said body means, a plurality of outlet ports in said body means and each connectable to an inlet port therein through one of said chambers, and a plurality of valve units of selectively different operating characteristics interchangeably seatable in said chambers, said valve units being insertible and removable as units and each including a unitary cartridge slidable into any of said chambers through said open end thereof and releasably securable adjacent said end to said manifold, a piston shiftable in said cartridge for controlling flow of fluid through a chamber, and removable means in said cartridge about said piston.

References Cited in the file of this patent

UNITED STATES PATENTS

| | | |
|---|---|---|
| 987,898 | McCurry | Mar. 28, 1911 |
| 1,472,265 | Bell | Oct. 30, 1923 |
| 2,039,638 | Druge | May 5, 1936 |
| 2,069,017 | Pratt et al. | Jan. 26, 1937 |
| 2,415,417 | Collins et al. | Mar. 11, 1947 |
| 2,486,087 | Wright | Oct. 25, 1949 |
| 2,645,450 | Chessman | July 14, 1953 |
| 2,661,762 | Bryant | Dec. 8, 1953 |
| 2,705,020 | Frantz | Mar. 29, 1955 |

FOREIGN PATENTS

| | | |
|---|---|---|
| 345,056 | Italy | Dec. 11, 1936 |